United States Patent [19]

Self

[11] Patent Number: 5,355,575
[45] Date of Patent: Oct. 18, 1994

[54] PALLET MOVING DEVICE

[76] Inventor: M. L. Self, 1712 Avenue F, Bay City, Tex. 77414

[21] Appl. No.: 13,751

[22] Filed: Feb. 4, 1993

[51] Int. Cl.⁵ ............................................. B23P 11/00
[52] U.S. Cl. ........................................ 29/430; 29/432; 29/772; 29/281.1; 269/14
[58] Field of Search ............ 29/430, 432, 772, 897.31, 29/784, 281.3, 281.1; 227/148, 154, 99; 269/13, 14, 910; 414/790, 790.1, 929

[56] References Cited

U.S. PATENT DOCUMENTS

| | | | |
|---|---|---|---|
| 3,231,101 | 1/1966 | Cooper | 414/929 |
| 3,557,439 | 1/1971 | Dykeman | 29/772 |
| 3,787,039 | 1/1974 | Zeichman | 269/13 |
| 4,077,106 | 3/1978 | Lichtenstein et al. | 29/772 |
| 4,195,963 | 4/1980 | Levkoff et al. | 414/790 |
| 4,234,282 | 11/1980 | Lewallyn | 414/790 |
| 4,358,236 | 11/1982 | Dudley | 414/929 |
| 4,492,016 | 1/1985 | Smets et al. | 29/432 |
| 4,815,395 | 3/1989 | Truegg | 269/910 |
| 4,998,336 | 3/1991 | Papsdorf | 269/910 |

Primary Examiner—Mark Rosenbaum
Assistant Examiner—David P. Bryant
Attorney, Agent, or Firm—Abe Hatcher; David J. Hill

[57] ABSTRACT

Method for transfer of a pallet from the slant table upon which it is made to a stacker or other location by using dual arms with endless chains thereon for moving the pallet after lifting the arms from a storage position just below an angled table surface to a horizontal position such that the upstream end of the pallet is raised. The pallet may be transferred by the chains to a starting position and raised and locked in a stack of pallets before another pallet begins the same cycle. The process may be made automatic by providing an air cylinder supplied by an air compressor both for lifting the upstream end of the pallet and raising the pallet into a stack of pallets and providing a duly connected limit switch for stopping the pallet where it is to be stacked.

4 Claims, 3 Drawing Sheets

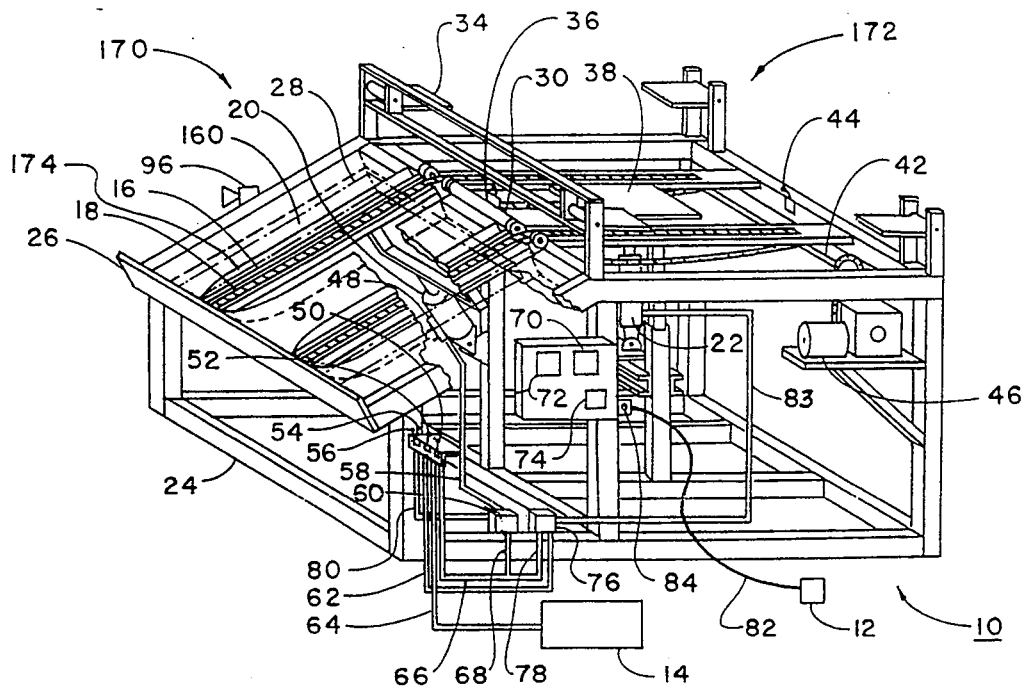
FIG 1
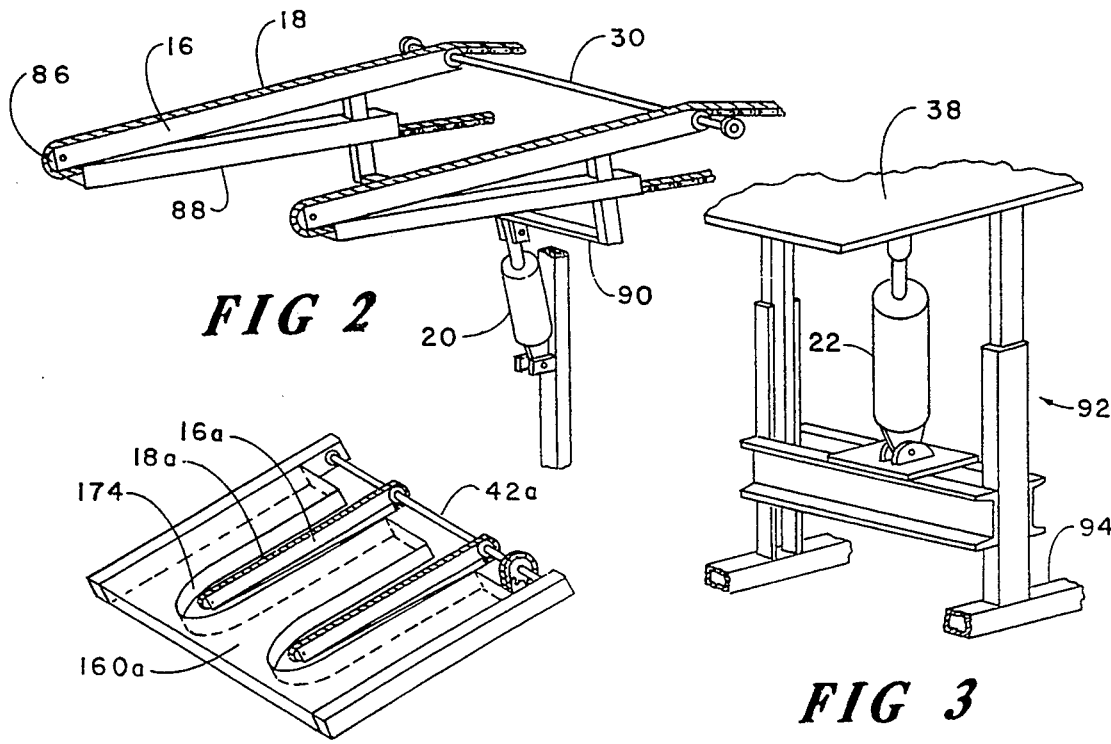
FIG 2
FIG 3
FIG 14

{ 5,355,575 }

PALLET MOVING DEVICE

FIELD OF THE INVENTION

This invention relates to pallet production. More particularly, it relates to assembling and moving pallets.

DESCRIPTION OF THE PRIOR ART

It is known to move assembled pallets from a flat surface by machine and also to stack them by machine. However, it is not known how to move finished pallets mechanically from an angled surface on which they were nailed together or directly to a stacker area for further moving.

SUMMARY OF THE INVENTION

After extended investigation I have found that I can build a pallet on an angled table and immediately transfer it to an adjacent surface as soon as the last nail is nailed into a pallet by an operator. The table which I use is angled upward toward a downstream end and of a size to hold up to the largest-size pallet. The pallet may be lifted to a horizontal position by two parallel mechanical arms underneath the top of the table in openings or cavities shaped to fit them and powered by a pressure device. The pallet is transferred by moving endless chains around the arms, which are lifted up to touch the bottom of the finished pallet and then raised to a level horizontal position and move the pallet by the chains onto whatever receiver is desired, for example, a continuous belt, a table top or other level surface. According to one embodiment of my invention I extend my continuous chains in-line downstream to a stacker which has a pallet holder also, of substantially the same size as the aforementioned table, that is, sufficient to hold a largest-size pallet, the pallet holder being for stacking pallets. In this instance pallets, one at a time, are moved along the continuous chains which here do not end at the edge of the pallet-moving table but continue on along the top part of a boxed-in frame of the stacker to the pallet holder, where they are lifted into and locked in place in the pallet holder at about or a little beyond the downstream end of which the dual-chain pallet conveyor ends. The pallet holding table with the two arms may be used separately from the stacker, for example, to move the pallet to a moving belt or the like for transfer elsewhere. For use with a stacker air pressure from below such as used for lifting the arms of the pallet-building and moving table is used to raise the pallets place on the pallet holder in the pallet stacker one after another and lock them in position, each being piled under a preceding one. Electricity may be used for a motor to turn the continuous chains to move the pallet and also for operating a timer system a horn-like signal and a limit switch which stops the chains and pallet when they reach the pallet holder for stacking. The pallet conveyor and the pallet conveyor-pallet stacker combination of the invention are operated by an integrated electricity relay system connected to an air compressor-pneumatic line system and the aforementioned motor for turning the chains of the two-arm pallet conveyor.

BRIEF DESCRIPTION OF THE DRAWING

For a better understanding of my invention reference will now be made to the drawing, in which, FIG. 1 is a corner perspective view from one side and one end of the slanted top parallel-arms two chain pallet conveyor of the invention in an embodiment in which it is placed adjacent to or joined to a pallet stacker.

FIG. 2 is a perspective view of the two parallel arms of the invention, each having a conducting chain thereover, showing also the air cylinder which lifts them up to raise a pallet thereon as shown in FIGS. 4–6, inclusive, for example, to a horizontal position at a stacker-top level.

FIG. 3 is an enlargement of a cylinder for elevating a pallet holder of a pallet stacker such as shown in FIG. 1.

FIG. 14 is a schematic view of the transfer of a pallet conducting table of the invention showing how the arms are sunk in openings before and while a pallet is being built on the tabletop.

DETAILED DESCRIPTION

Figure 12:
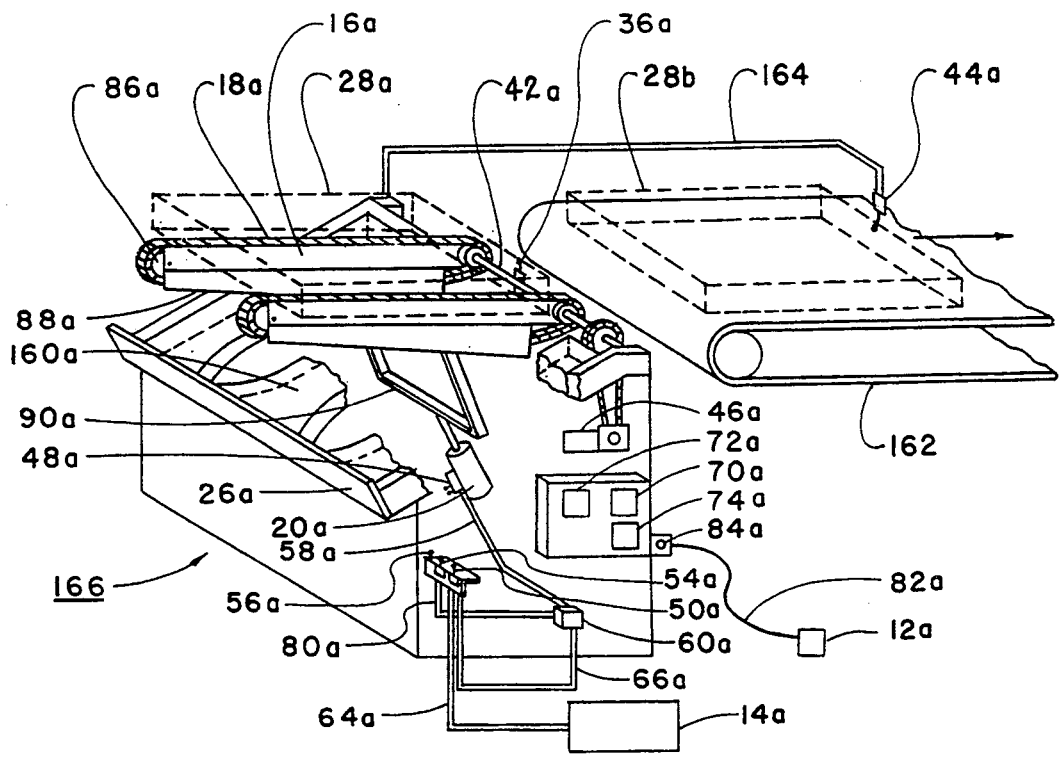
FIG. 12 is a perspective view showing the two-arm, slanted-table pallet mover of the invention and a typical moving belt onto which the pallet may be transferred according to another embodiment of the invention.
Figure 13:
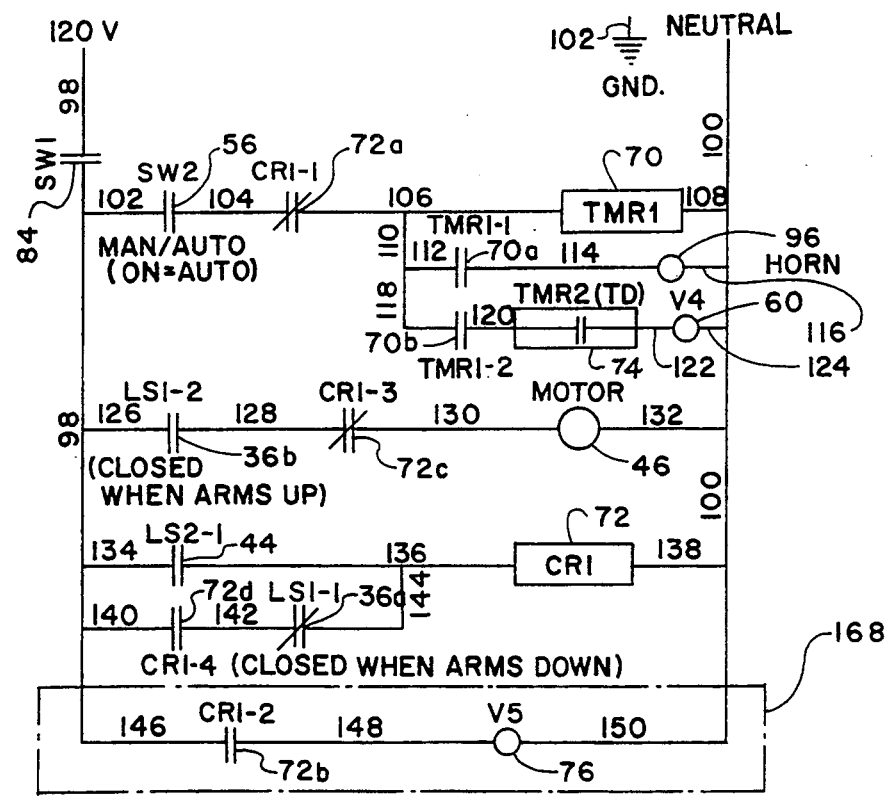
FIG. 13 is a schematic diagram showing an electrical system used in automizing the process and apparatus of the invention.

In the drawing and the description thereof, small letters a, b, c and the like after numerals such as 10, 12, 14 and the like refer to the same or similar parts in different figures. In the following electrical and related portion of the description of the drawing, CR refers to control relay, TD to time delay, LS to limit switch, SW to switch, TMR to timer, CYL to cylinder and V to valve. TMR 1-1 70a is the first contact for TMR 1 70 and CR 1-1 72a, the first contact for CR 1 72. Also, at least some of the points referred to here in connection with the electrical diagram of FIG. 13 are also shown in FIG. 1 and FIG. 12. The portion of the electrical circuit FIG. 13 enclosed by a dotted line and numbered 168 is used only when the pallet mover is used with the pallet stacker.

According to the invention, two parallel arms 16 on a sloping, angled or slanted table top 160 of a pallet mover 170 carry a pallet from a table top to another surface such as a stacker 172, a belt conductor 162, or the like, for further movement. The arms 16, which may be supported on a lifting arm stiffener and chain retainer 88 having a bracket assembly 90 for connecting arms 16 to a pneumatic or air cylinder 20 (CYL 1), have endless chains 18 going therearound. When properly engaged to supply air pressure, CYL 1 20 lifts the upstream ends of the arms with a pallet just completed thereon so that the pallet on the arm 16 and its chains 18 presents a horizontal surface for conducting the pallet to a complementing surface for further movement or stacking, for example, the stacker of FIG. 1 or the moving belt of FIG. 2. If the former is used, the endless chains 18, 18a actually must continue via an intermediate idle chain roller 30 (FIG. 1) until a pallet holder 38 of the stacker, in the vicinity of which endless chains 18 end at driven sprocket 42, 42a (FIGS. 1 & 12) is reached. Then, by the signal of a limit switch (LS) 44, 44a, the pallet is lifted by another cylinder 22 (CYL 2) underneath the pallet holder 38 to the lowest position available in a stack and locked in place at the bottom of the stack by locks 34. Another pallet is being built with a gun hammer on angled table top 160, 160a while a timer (TMR 1 70 of FIG. 13) is counting down to the beginning of another cycle with CYL 1 20 moving the pallet up to level position and delivery to stacker 172 of FIG. 1 or to a moving belt 162 such as that of FIG. 12.

Figure 11:
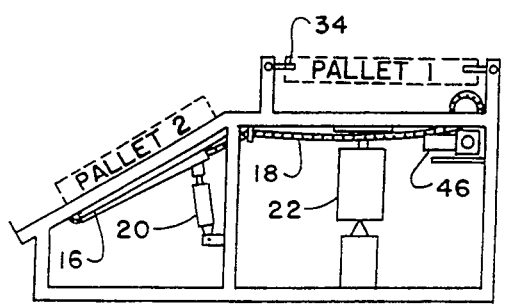

When the pallet is delivered, as shown in FIG. 1, after raising to horizontal position by CYL 1 20 of the arms 16 on which the pallet has been made by gun nailing and being conducted to a stacker such as 172 by continuous chains 18, 18a, which pass over idle chain roller 30 and go on with the pallet to pallet holder 38, the pallet passes through the steps shown in schematic FIGS. 4–11, inclusive, (as in continuous clips from a movie film) until the pallet shown as pallet 1 in FIGS. 4–11, inclusive, is locked into the stack after LS 2 44 has cut off the power from power source 12, 12a to chains 18, 18a when the pallet reaches a lifting position on the pallet holder 38 and is lifted by CYL 2 22 to a height where it is locked in by locks 34 (The pallet may already have a pallet above it if not the first in the stack.) and another pallet has been finished on slanted or angled table top 160 prior to the arms 16 being raised by CYL 1 20 (FIG. 11).

A process cycle begins according to the invention when an operator, using power hammers, making a pallet 28 on the angled table top 160, 160a of pallet mover 170 completes the pallet and a timer, if on automatic, or the same or a different operator, actuates CYL 1 20 to lift the trailing end of the newly made pallet from its angled position on the pallet lifting and moving table 166, 170 by two supporting parallel arms 16 just beneath the tabletop level 160, 160a in two corresponding parallel openings 174, into a horizontal position. The pallet is then moved by endless chains 18, 18a around arms 16, 16a from end to end, and a sprocket drive 42, 42a onto another surface, for example, an endless belt, such as 162 of FIG. 12 or, onto a pallet holder 38 of a stacker 172 by way of an intermediate idler roller 30, before being lifted by CYL 1 22 under pallet holder 38 into a bottom-of-stack position and locked there by four corner locks.

The embodiment of the invention shown in FIG. 12 depicts the pallet mover 166 with its electrical and air pressure supports in association therewith completely separated and apart from moving belt 162, which has received a pallet 28b moved as pallet 28a from pallet conductor chains 18a having sprockets 86, 86a. Limit switch 44a may be used to stop movement of pallet 28b at the desired point.

Figure 4:
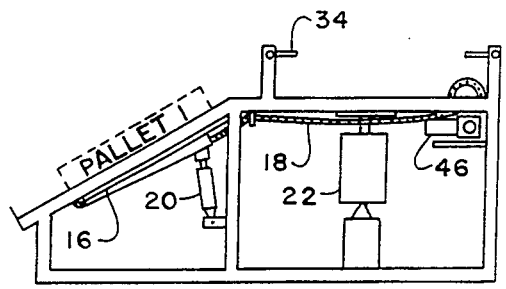
FIGS. 4 to 11, inclusive, are still views of the various positions of the pallet as it raised by the pallet mover and then, when the two-arm pallet feeder is used in conjunction with the pallet stacker, the pallet is transferred by an additional length of the two-chain conductor to the stacker for stacking.
Figure 5:
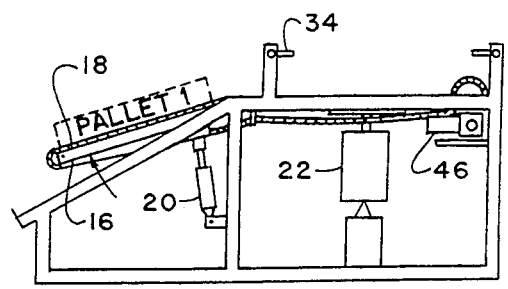
Figure 6:
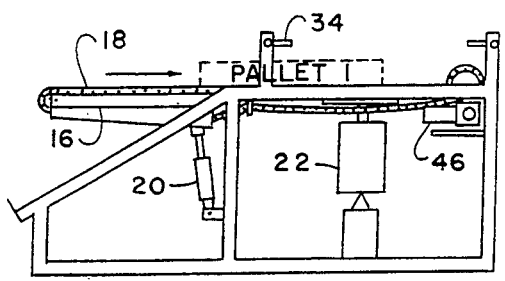

For automatic operation of the dual-system two-chain conveyor system of the invention according to an embodiment of the invention in which a combination 10 (FIG. 1) of conveyor 170 and stacker 172 is employed, main SW 1 84 is put to the automatic position to send power from 120-volt power source 12, 12a via line 82 and part of line 98 to main power SW 1 84, and then via another part of line 98, line 102, SW 2 56 having manual and automatic (on) settings, line 104, CR 1-1 72a and line 106 to TMR 1 70, from which line 108 leads to neutral line 100. After sufficient time set on TMR 1 70 to build a pallet on angled top 160, 160a of pallet conveyor 170, TMR 1-1 70a (which draws electricity via lines 110, 112 from line 106) closes, sending electricity via line 114 to horn 96, from which line 116 leads to neutral line 100, activating TMR 2 (TD) 74, from which line 122 leads via V-4 60, 60a and line 24 to neutral line 100. After a set delay, TMR 2 (TD) 74, with electricity received via lines 106, 110 and 118, TMR 1-2 70b and line 120 from the same 120-volt source, sends power to V-4 60, 60a via line 122, which continues on to neutral line 100 via line 124. V-4 60, 60a opens and sends air pressure through lines 58, 58a and V-7 48, 48a via 58, 58a (see FIGS. 1 & 12) to CYL 1 20, 20a, supplied with air from air compressor 14, 14a, which raises arms 16, 16a (FIGS. 1 & 12). When the arms become horizontal, LS 1-2 36b, connected to line 98 by line 126 and closed when the arms 16 are in the up position, closes to activate CR 1-3 72c via line 128 to start motor 46, 46a via line 130, which continues on to neutral line 100 by line 132. Motor 46, 46a starts chains 18, 18a to move a pallet onto the pallet holder 38, when it strikes LS 2-1 44, receiving power via lines 98 and 134, closing it, and, via line 136, activating CR 1 72, which is connected to neutral line 100 by line 138. Contact CR 1-1 72a then opens, cutting off TMR 1 70 via line 106, horn 96 (line 116 leading from horn 96 to neutral line 100) via lines 106, 110, 112, TMR 1-1 70a and line 114, TMR 2 (TD) 74, with electricity received via lines 106, 110 and 118, TMR 1-2 70b and line 120. This releases pressure to CYL 1 20 (FIG. 2), lowering arms 16. Contact CR 1-3 72c simultaneously opens at this time and stops the motor 46, 46a via line 130. CR 1-2 72b turns the power on to V-5 76 via line 148. This releases air pressure to CYL 2 22 to push the pallet (FIG. 7) up to allow stacking locks 34 which I call "flappers", to engage the pallet and hold it up. When the pallet moves up, it lets LS 2-1 44 reopen to deactivate CR 1 72 via line 136, line 138 going from there to neutral line 100. When the arms 16 are completely lowered, LS 1-2 36b opens while LS 1-1 36a closes to close CR 1-4 72d and reactivate CR 1 72. When CR 1-1 72a contact closes, TMR 1 70 is activated via line 106. Then CR 1-2 72b contact opens to turn the power off via line 148 to V5 76, from which line 150 goes to neutral line 100. This lets CYL 2 22 come down to open and let air pressure hold CYL 1 20 in the up position with the arms 16 raised. When the chains 18, 18a pull the pallet up to LS 2-1 44, 44a, LS 2-1 44, 44a sends power to CR 1-2 72b, which stops power to V-4 60, 60a via line 148, V-5 76, line 150, line 100 and line 124, thereby releasing pressure to CYL 1 20 to lower the arms 16, 16a, stopping power to horn 96, TMR 1 70, TMR 2 (TD) 74, 74a and also turning the power off to motor 46, 46a, thereby via relays stopping chains 18. LS 2-1 44, 44a then turns the power on to V-5 76, which lets air pressure push CYL 2 22 up, pushing the pallet up to the pallet locks 34, which hold the pallet up in place underneath the pallet that was transferred to the pallet holder 38 just before it (FIG. 11). When the arms 16 are completely lowered LS 1-1 36a sends power to TMR 1 70, which restarts the countdown and turns the power off to V-5 76, releasing pressure to CYL 2 22, and allowing air pressure through V-2 54, 54a, line 58 to V-4 60 and through V-4 60, line 68, V-6 and V-7 48, pushing CYL 1-1 20 up to raise arms 16, 16a (FIG. 5), which, upon being raised close LS 1-2 36 and send electricity to relay 72, which conducts electric power to motor 46. This turns chains 18 driven on sprocket 42, 42a, pulling the pallet 28 into the stacking area (FIG. 6). When the pallet reaches LS-2 44, power is sent to CR 1 72, which turns off power to motor, stopping chains 18, 18a.

Figure 7:
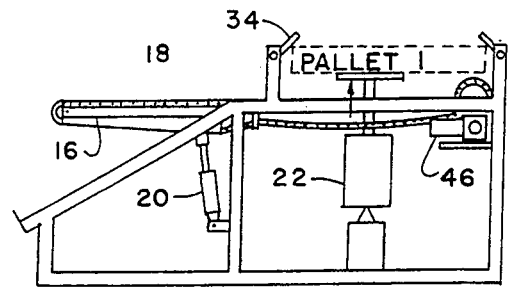
Figure 8:
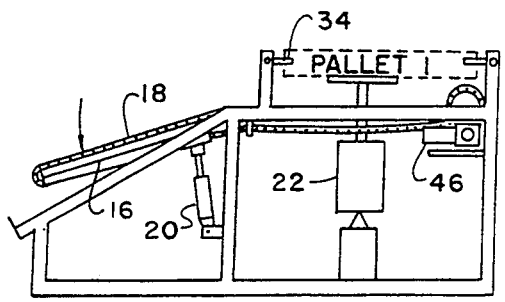
Figure 9:
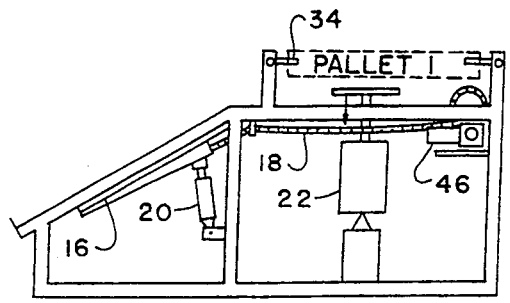
Figure 10:
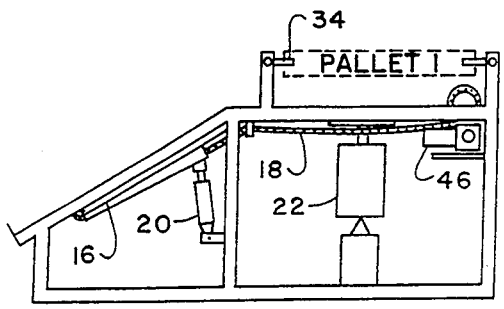

The operator then pulls V-2 56 to a lowering position to release air pressure, lowering CYL 1 20 (FIGS. 1, 2 & 12) to lower arms 16 (FIG. 8). When V-3 52 is pushed into pallet holder, raising position, it allows air pressure through V-3 52d to V-5 76, pushes CYL 1-2 22 up so as to raise the pallet holder 38 and lift the pallet to pallet locks 34, which fall into the pallet to hold it up above the pallet holder 38 (FIG. 7). The operator next pulls V-3 52 to a lowering position to release the air pressure and lower CYL 2 22. This lowers the pallet holder 38 (FIG. 9). The process continues by another pallet being raised by arms 16 and conducted off of the angled table top 160 by dual-chain drive 18, 18a and stacked under a previous one by pallet holder 38 of pallet stacker 172 (FIGS. 1 and 4–11 inclusive).

In operating the pallet transfer system of the invention automatically, the operator plugs in SW 84, which receives electricity from source 12 via line 98 and also opens the air pressure source 14, 14a. He then puts SW 2 56 into the "on" position and relays power to TMR 1 70, thereby starting TMR 1 70, counting down. When V-1 50 is pushed to automatic, air pressure is put on V-4 60 and V-5 76. After TMR 1 70 finishes counting it sends electricity to horn 96 and TMR 2 70b delay, which, when the countdown ends, sends power to V-4 60, which opens to send air pressure through V-6 and V-7 48 to CYL 1 20 to raise it and arms 16, 16a (FIGS. 1 and 12). When this happens, LS 1-1 36a opens and LS 1-2 36b closes, sending power to the motor 46, 46a which turns chains 18, 18a via sprocket 42 to pull the pallet onto pallet holder 38 of pallet stacker 172. TMR 1-2 70b holds V-4 60 which lowers pallet holder 38. The pallet transfer and stacking cycle is then repeated.

Additional components depicted in the drawing used in operating the pallet mover of the invention and not heretofore dealt with in particular include a toe piece 26, 26a, on the pallet mover 170; pneumatic line 64, 64a from air compressor 14 to SW 2 56, 56a; line 80a to V-4 60, 60a; pneumatic line 62 from V-5 76 to SW 52; pneumatic line 66 from V-5 76 to V-6 and V-7 48, 48a and CYL 1 20 and pneumatic line 68 from V-4 60 to line 66; line 58, 58a from CYL 1 20, 20a and control route therefor; SW 1 84, 84a, coming via line 82, 82a from electricity source 12; pneumatic line 83, from V-5 76 to CYL 2 22, to raise the pallet 28 into stacking place; TMR 1 70, 70a; CR 1 72, 72a; a timer-delay 74, 74a and V-6 and V-7 48, 48a and CYL 1 20, 20a used to move arms 16 with chains 18 up into horizontal position to move a pallet thereon off to another surface such as 162.

While the invention has been described in terms of preferred embodiments, the claims appended hereto are intended to encompass all embodiments which fall within the spirit of the invention.

Having thus described my invention and certain preferred embodiments thereof, I claim:

1. In a process for building a pallet and moving it to another location, the improvement which comprises:
    (a) providing a table having an angled upon which a pallet may be built;
    (b) building a pallet on the angled surface of the table;
    (c) mechanically raising the finished pallet off of the angled surface of the table to a substantially horizontal position; and
    (d) conveying the finished pallet away from the table.

2. The improved process of claim 1, wherein a pair of openings are provided in the angled surface of the table, and a pair of mechanical arms are provided, each of which is disposed to move from below the angled surface of the table through a respective one of the openings, and an upwardly-directed force is applied to the mechanical arms to raise the finished pallet off of the angled surface of the table to a substantially horizontal position.

3. The improved process of claim 1, wherein the finished pallet is conveyed away from the table to a pallet stacker.

4. The improved process of claim 3, wherein the finished pallet is conveyed to the pallet holder which is part of the pallet stacker, and the finished pallet is raised from the pallet holder into position at the bottom of a stack of finished pallets.

* * * * *

UNITED STATES PATENT AND TRADEMARK OFFICE
CERTIFICATE OF CORRECTION

PATENT NO. : 5,355,575
DATED : October 18, 1994
INVENTOR(S) : M. L. Self

It is certified that error appears in the above-identified patent and that said Letters Patent is hereby corrected as shown below:

Column 6, Line 15        After "angled" insert --surface--.

Signed and Sealed this

Twenty-seventh Day of December, 1994

Attest:

BRUCE LEHMAN

Attesting Officer    Commissioner of Patents and Trademarks